United States Patent
Gretsch et al.

(10) Patent No.: US 11,660,855 B2
(45) Date of Patent: May 30, 2023

(54) METHOD AND DEVICE FOR MONITORING AN ACCESS POINT LEADING INTO A SAFETY ZONE OF A ROLL WINDER OR UNWINDER, AND PRINTING PRESS

(71) Applicant: KOENIG & BAUER AG, Würzburg (DE)

(72) Inventors: Harald Gretsch, Eibelstadt (DE); Jürgen Krimmel, Wasserlosen (DE); Manfred Maierhöfer, Volkach (DE); Günter Schulz, Abersfeld (DE); Senad Ugljesa, Eisingen (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 17/925,043

(22) PCT Filed: Mar. 23, 2021

(86) PCT No.: PCT/EP2021/057387
§ 371 (c)(1),
(2) Date: Nov. 14, 2022

(87) PCT Pub. No.: WO2022/017652
PCT Pub. Date: Jan. 27, 2022

(65) Prior Publication Data
US 2023/0132779 A1 May 4, 2023

(30) Foreign Application Priority Data
Jul. 24, 2020 (DE) .................... 10 2020 119 565.6

(51) Int. Cl.
*B41F 33/00* (2006.01)
*B65H 26/08* (2006.01)
*F16P 3/14* (2006.01)

(52) U.S. Cl.
CPC ......... *B41F 33/0018* (2013.01); *B65H 26/08* (2013.01); *F16P 3/144* (2013.01)

(58) Field of Classification Search
CPC ....... B41F 33/0018; B65H 26/08; F16P 3/144
See application file for complete search history.

(56) References Cited

U.S. PATENT DOCUMENTS

2017/0052278 A1* 2/2017 Stein ................... G01V 8/20

FOREIGN PATENT DOCUMENTS

DE   102006029643 A1   1/2008
DE   102010031650 A1   1/2012
(Continued)

OTHER PUBLICATIONS

International Search Report of PCT/EP2021/057387 dated Jun. 23, 2021.

*Primary Examiner* — Georgia Y Epps
*Assistant Examiner* — Don J Williams
(74) *Attorney, Agent, or Firm* — Mattingly & Malur, PC (57) ABSTRACT

In some examples, an access point that leads into a safety zone of a roll unwinder or winder is monitored by a monitoring sensor system. The monitoring sensor system includes two scanners having respective measuring beams that pass over an angular region situated in the same plane extending in an opening. The access point is monitored in a pattern of multiple protection fields having various sizes and/or shapes. Multiple ones of the protection fields are encompassed by a next-larger and/or next-wider protection field, entirely or at least viewed in the width and toward the top. The scan images of the two scanners are checked for a breach of the relevant protection fields in differing, adjoining, or overlapping partial regions of the plane. Information about the permissibility of a determined protection field breach is derived by evaluation of breach patterns of (Continued)

breached protection fields obtained in the two partial regions.

15 Claims, 7 Drawing Sheets

(56) References Cited

FOREIGN PATENT DOCUMENTS

| | | |
|---|---|---|
| DE | 202017103399 U1 | 9/2018 |
| DE | 102017211828 A1 | 1/2019 |
| DE | 102019116806 A1 | 12/2020 |
| EP | 3339715 A1 | 6/2018 |
| EP | 3415804 A1 | 12/2018 |

* cited by examiner

METHOD AND DEVICE FOR MONITORING AN ACCESS POINT LEADING INTO A SAFETY ZONE OF A ROLL WINDER OR UNWINDER, AND PRINTING PRESS

CROSS-REFERENCES TO RELATED APPLICATIONS

This application is the US national phase, under 35 USC § 371, of PCT/EP2021/057387, filed on Mar. 23, 2021, published as WO 2022/017652 A1 on Jan. 27, 2022, and claiming priority to DE 10 2020 119 565.6, filed Jul. 24, 2020, the disclosures of which are expressly incorporated by reference herein in their entireties.

TECHNICAL FIELD

Examples herein relate to a method and to a device for monitoring an access point leading into a safety zone of a roll winder or unwinder, and to a printing press comprising such a device. For instance, the method may include monitoring an access point that leads into a safety zone of a roll unwinder or winder, and through which rolls can be transported in and/or out along a transport path. The access point is formed by an opening provided between two elements that mechanically delimit the safety zone. The access point is monitored by a monitoring sensor system of a monitoring system. Two scanners encompassed by the monitoring sensor system, with their respective measuring beams, in each case pass over an angular region situated in the same plane extending in the opening.

Additionally, the device may monitor an access point leading into a safety zone of a roll unwinder or winder, through which rolls can be transported in and/or out, in particular for carrying out the method. The access point is formed by an opening provided between two elements that mechanically delimit the safety zone, and a monitoring sensor system is provided for monitoring the access point. The monitoring sensor system includes two scanners, the respective measuring beams of which in each case pass over an angular region situated in the same plane extending in the opening.

Furthermore, the printing press may include a roll unwinder from which web-format printing substrate can be unwound, and/or a roll winder onto which previously printed web-format printing substrate can be wound, and a printing unit. Additionally, a safety zone extends on at least the operating side of the unwinder and/or winder, which is bounded by the unwinder and/or winder themselves, as well as by one or more adjoining sub-assemblies and/or mechanical barrier devices. The safety zone includes at least one first access point, which is monitored by sensors and through which rolls can be transported into and/or out of the safety zone.

BACKGROUND

A web-fed printing press, comprising a roll winder and a roll unwinder, is known from DE 10 2017 211 828 A1, wherein an access point to a safety zone of the roll winder is formed by a monitoring sensor system in the manner of a multi-beam, for example two-beam, photoelectric sensor system including a muting function.

DE 10 2010 031 650 A1 relates to a reel changer comprising a safety zone, wherein an access point into a safety zone is monitored by a light barrier comprising a multiplicity of photoelectric sensors.

EP 3 415 804 A1 relates to a safety device for securing a passage, wherein a scanner, for example arranged centrally above the passage, checks the access point for an allowed object and, if such an object is present, so-called muting takes place, i.e., the safety function is suspended. In the exemplary embodiment involving four transport webs extending parallel next to one another, the passage is monitored by means of two scanners arranged in the respective upper corners. The two scanners observe two protection fields, which complement one another to form the overall monitoring area.

In DE 10 2006 029 643 A1, object features of an approaching object are detected by one sensor, or possibly two sensors, based on which a classification as a safety-critical or not safety-critical object takes place. In the case of a safety-critical object, an alarm signal is generated even before the safety zone is reached.

DE 10 2019 116 806 A1 relates to a device and a method for monitoring a danger zone, wherein a first laser is provided for monitoring a plane parallel to the opening, and a second laser is provided for monitoring a second plane.

An access protection system is disclosed in DE 20 2017 103 399 U1, wherein a first sensor monitors the access plane, and a second sensor detects an approaching object in terms of its contour leading up thereto.

EP 3 339 715 A1 relates to an access protection system, in particular for protecting staff against robots and machines during automatic production and packaging processes. The access protection system comprises two laser scanners which monitor adjoining or overlapping safety protection fields as well as two or more detection protection fields on each side. Objects defined as being permissible to pass through are to be recognized by the detection protection fields, so as to deactivate the safety field in an area corresponding to the known object. The left and right detection protection fields are directed at distinctive spots of the allowed objects.

SUMMARY

It is an object herein to devise a method and a device for monitoring an access point leading into a safety zone of a roll winder or unwinder, and a printing press comprising such a device.

This object is achieved in some examples by a method for monitoring an access point in which the access point is monitored in a pattern of protection fields including multiple protection fields having various sizes and/or shapes. Multiple ones of the protection fields having various sizes and/or shapes are encompassed by a next-larger and/or next-wider protection field, entirely or at least viewed in the width and toward the top.

Further, for multiple ones of the protection fields having various sizes and shapes, the scan images of the two scanners are checked for a breach of the relevant protection fields having various sizes and/or shapes in differing, adjoining, or overlapping partial regions of the plane. Information about the permissibility of a determined protection field breach is derived by way of an evaluation of the breach patterns of breached protection fields obtained in the two partial regions.

The object is further achieved in some examples by a device for monitoring an access point leading into a safety zone of a roll unwinder or winder in which a pattern of protection fields including multiple protection fields having various sizes and/or shapes is provided for monitoring the access point. Multiple ones of the protection fields are encompassed by a next-larger and/or next-wider protection field, entirely or at least viewed in the width and toward the top. An evaluation means, for multiple ones of the protection fields having various sizes and shapes, checks and/or can check the scan images of the two scanners for a breach of the relevant protection fields having various sizes and/or shapes in differing, adjoining or overlapping partial regions of a plane.

The object is further achieved in some examples by a printing press that includes a roll unwinder, from which web-format printing substrate can be unwound, and/or a roll winder, onto which previously printed web-format printing substrate can be wound, and that further includes a printing unit. The printing press incorporates the device for monitoring an access point as discussed above.

The advantages to be achieved with the invention are, in particular, that the solution is easy to adapt, for example without having to modify the scope of the sensor system, to applications using various ranges of roll sizes and/or roll types. For example, it is also possible to implement applications, without increasing the number of sensors, in which the spectrum of rolls ranges from a roll diameter of, for example, 200 mm up to 1,800 mm and/or in which the roll diameter is stepped and varies across the length. Such large and/or even stepped rolls are important in particular in package printing and/or for industrial printing operations using a printing press comprising a printing unit which operates according to a plateless printing method, for example an ink jet printing method.

Examples include monitoring an access point which leads into a safety zone of a roll unwinder or winder and through which rolls of material can be transported in and/or out, wherein the access point is formed by an opening provided between two elements that mechanically delimit the safety zone, and wherein the access point is monitored by a monitoring sensor system. Two scanners encompassed by the monitoring sensor system, with their respective measuring beams, in each case pass over an angular region situated in the same plane extending in the opening. The access point is monitored in a pattern of protection fields including multiple protection fields having various sizes and/or shapes, wherein, for multiple of the protection fields having various sizes and/or shapes, the scan images of the two scanners are checked for an, in particular simultaneous, breach of the relevant protection fields having various sizes and/or shapes in differing, adjoining or overlapping partial regions of the plane, and information about the permissibility of a determined protection field breach is derived by way of an evaluation of the breach patterns of breached protection fields obtained in the two partial regions.

The aforementioned protection fields having various sizes and/or shapes overlap, for example, at least partially in their surface, or at least one or more of the protection fields having various sizes and/or shapes are even encompassed by a next-larger and/or next-wider protection field, entirely or at least viewed in the width and/or toward the top, preferably at least in the width and toward the top.

In particular, the scan images originating from the two scanners are evaluated for a protection field breach in the differing, possibly overlapping, partial regions of the respective relevant same protection field.

For checking for a protection field breach, preferably protection fields are used which are situated in the monitored plane E and extend toward both sides mirror-symmetrically with respect to a vertical that, relative to the horizontal extension in the plane, is situated centrally in relation to the transport path. This vertical V, for example as viewed in the horizontal direction of the plane or of the passage, extends through the point in the plane through which a center, as viewed relative to the width, of the object to be transported regularly extends, for example at half the length of the axis of symmetry of a roll to be transported, or the central axis, extending in the transport direction, of a container to be transported, as this object, for example roll or receptacle, passes through. This is defined, for example, by the characteristic of a transport means and its mechanically or otherwise predefined travel route.

In a device that is to be particularly preferred, in particular for this purpose, an access point into a safety zone is formed by an opening that is provided between two elements that mechanically delimit the safety zone, wherein a monitoring sensor system is provided for monitoring the access point, which comprises two scanners, the measuring beams of which each pass over an angular region situated in the same plane extending in the opening. For monitoring, in particular a pattern of protection fields including multiple protection fields having various sizes and/or shapes is provided, of which at least one or more is or are encompassed by a next-larger and/or next-wider protection field, entirely or at least as viewed in the width and/or toward the top, preferably at least in the width and toward the top, wherein evaluation means are included by way of which, for multiple of these protection fields having various sizes and/or shapes, the scan images of the two scanners are checked and/or can be checked for a breach of the relevant protection fields having various sizes and/or shapes in differing, adjoining or possibly overlapping partial regions of the plane.

The evaluation means can thus be used to check or evaluate in particular the scan images of the two scanners for a protection field breach in the differing partial regions, i.e., deviating from one another, of the same protection field situated in the plane, or respective same protection fields.

The protection fields are provided, for example, so as to be defined as partial regions in the plane to be monitored, for example by parameterization in software encompassed by the scanners or data processing means connected thereto. They can preferably be varied, for example by way of variable parameters.

In a particularly advantageous refinement, various monitoring cases are defined or can be defined, in which various differing field sets, i.e., patterns of protection fields, are used for various operating situations, i.e., classes or types of passing objects. In an embodiment of this refinement to be preferred, recognition, and potentially required switching, take place automatically according to specified rules.

BRIEF DESCRIPTION OF THE DRAWINGS

Exemplary embodiments of the invention are illustrated in the drawings and will be described in greater detail below. The drawings show.

DETAILED DESCRIPTION

Figure 1:
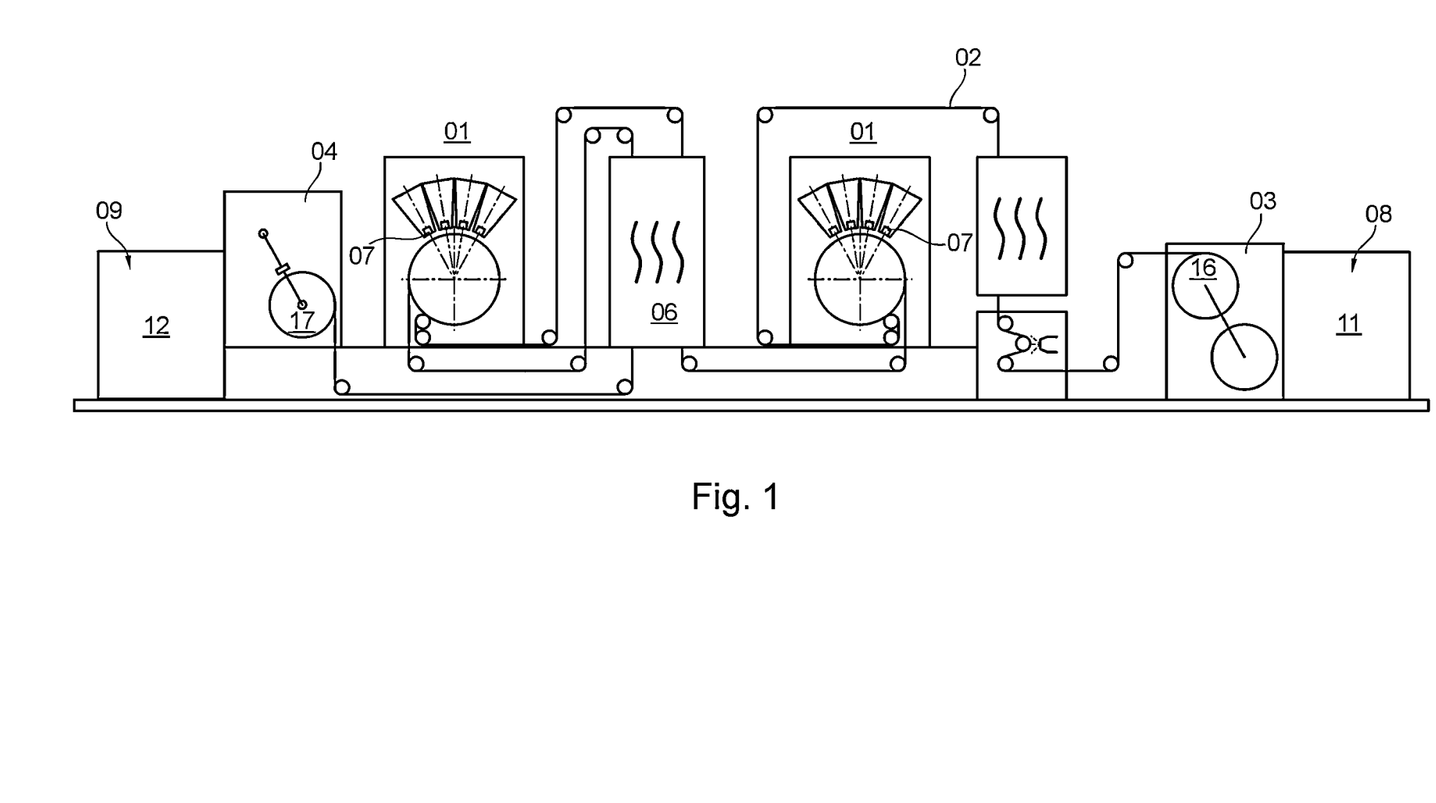
FIG. 1 an exemplary embodiment of a printing press comprising a roll winder and unwinder.

A printing press, advantageously configured as a web-fed printing press, comprises one or more printing units 01, by which a printing substrate 02, for example a printing substrate web 02, can be consecutively printed on the same side or on both sides, in particular using an ink jet method, a printing substrate infeed 03, for example an unwinder 03, for example a roll unwinder 03, in particular a reel changer 03, a downstream product receiving system 04, for example a winder 04, in particular a roll winder 04, as well as preferably a dryer 06 arranged downstream from the respective printing unit 01 in the printing substrate path. In a preferred embodiment, the printing unit 01, for multicolor printing, comprises a plurality of printing devices 07 arranged behind one another in the printing substrate transport direction, in particular ink jet print heads 07, each comprising one or more nozzles for the controlled delivery of the ink.

Figure 2:
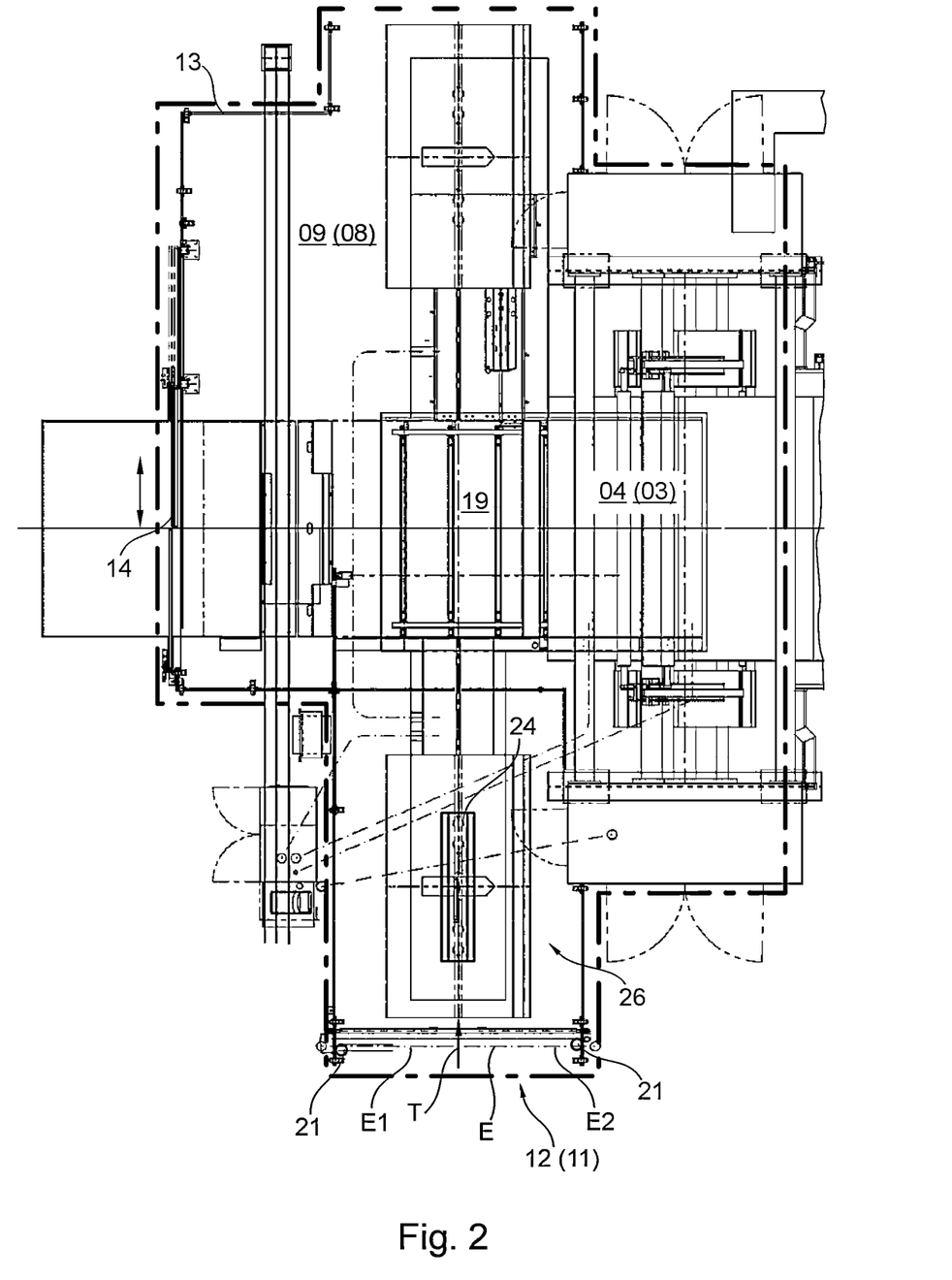
FIG. 2 a top view onto a safety zone including an access point using the example of the roll winder.

On the operating side of the roll unwinder 03 and/or of the roll winder 04, from which, in the case of the roll unwinder 03, a new roll 16 can be loaded and/or an empty core or a not completely unwound roll 16 can be removed and, in the case of the roll winder 04, a core can be loaded and/or a finished roll 17 can be removed, a safety zone 08; 09 extends, for example, across at least the width of the winder 04, which is essentially completely delimited, on the one hand, by the unwinder 03 or winder 04 itself, as well as, on the other hand, by one or more adjoining sub-assemblies and/or mechanical barrier devices 13 as well as by one or more access points 11; 12 monitored by sensors, such that entering, during operation, by operators and/or feeding or removal of rolls 16; 17 or cores can only take place via monitored access points 11; 12. The access point 11; 12 is formed by an opening that is provided between two elements delimiting the safety zone 08; 09.

In addition to an access point 11; 12 provided for rolls and/or sleeves to pass through, an access option, for example a door 14 that is preferably monitored by sensors, in particular a sliding door 14, can be provided, which allows the operators to enter the protected area, i.e., the safety zone 08; 09, when a certain machine state is present.

For the roll and/or core to pass through, a sensor-monitored access point 11; 12 is preferably provided on an end-face machine side with respect to the roll unwinder 03 or roll winder 04 and/or laterally aligned with a transfer spot 19 upstream from the roll unwinder 03 or roll winder 04.

Figure 3:
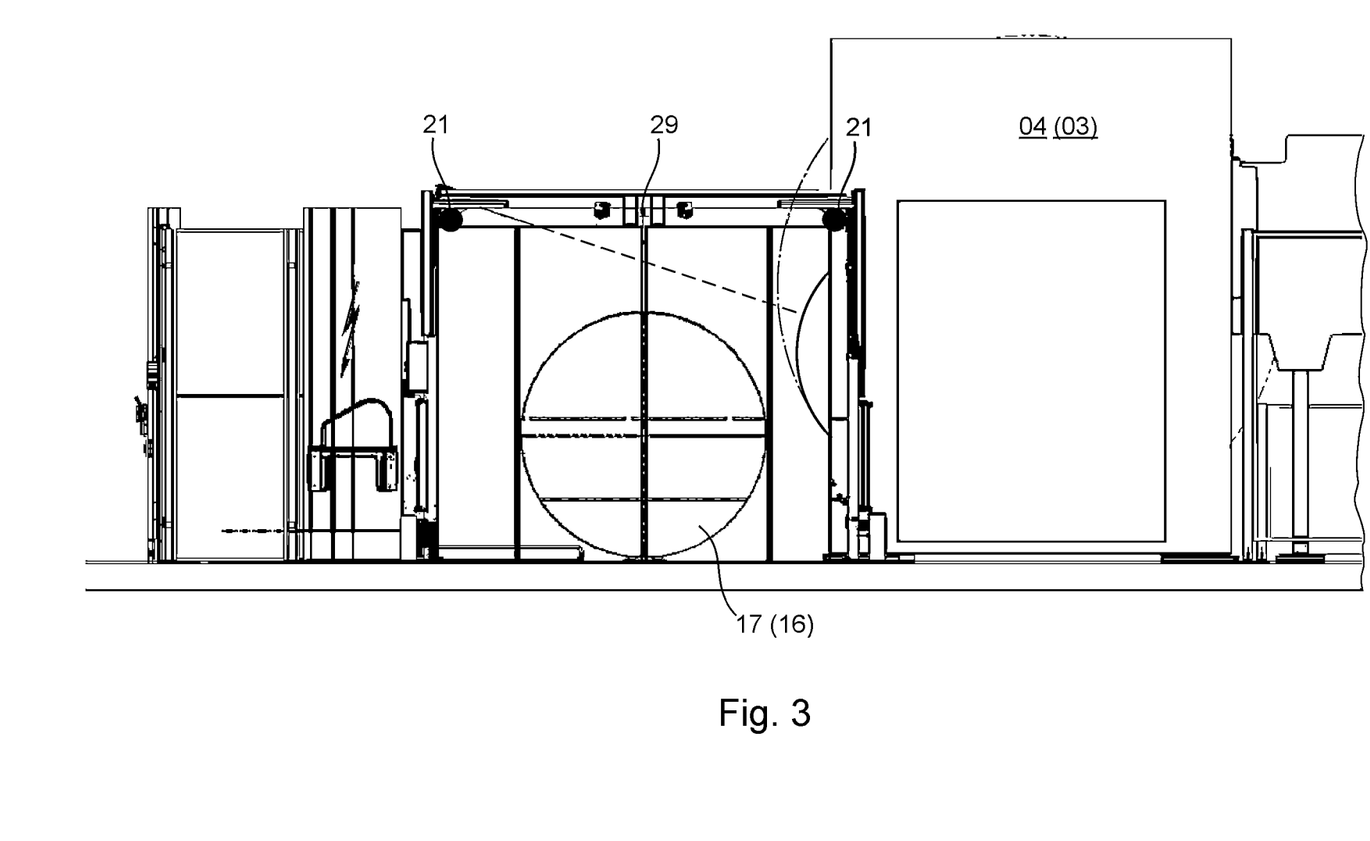
FIG. 3 a side view of a safety zone upstream from a roll winder according to FIG. 2 including an access point.

Such a safety zone 09; 08, including an access point 12; 11 monitored by way of sensors, is outlined hereafter and in FIG. 2 and FIG. 3 based on the example of the roll winder 04, however is to be applied accordingly to a design of a safety zone 08 that is provided, instead or in addition, at the roll unwinder 03. The reference numerals assigned accordingly to the roll unwinder 03 are shown in this regard in parentheses. The solution according to the invention is also to be applied, for example, to a roll unwinder 03 of a printing press in which an unwound printing substrate web 02 is cut upstream from the only or first printing unit 01 into printing substrate sheets, onto which printing subsequently takes place.

The, preferably "end-face", access point 12 (11) for rolls 17 (16) and/or cores to pass through is preferably configured as an open passage 12 (11), comprising an optically based monitoring sensor system to protect the area, which optically monitors the access point 12 (11), in particular in the region of a plane E, for example a monitoring plane E, which is situated in the access point 12 (11) and preferably extends horizontally. The monitoring plane E is preferably situated perpendicularly to a transport direction T that is present during the passage of the roll 17 (16) and/or core along a transport path. The transport path is preferably mechanically predefined, for example by a guide device or by a guide 18 guiding a transport means 24, for example transport cart 24, for example of a chain guide, which is provided in the floor in a recessed manner and used for advancing the transport cart, or at least is marked optically or in another manner for the case of a free, i.e., unguided, transport means 24.

Figure 4:
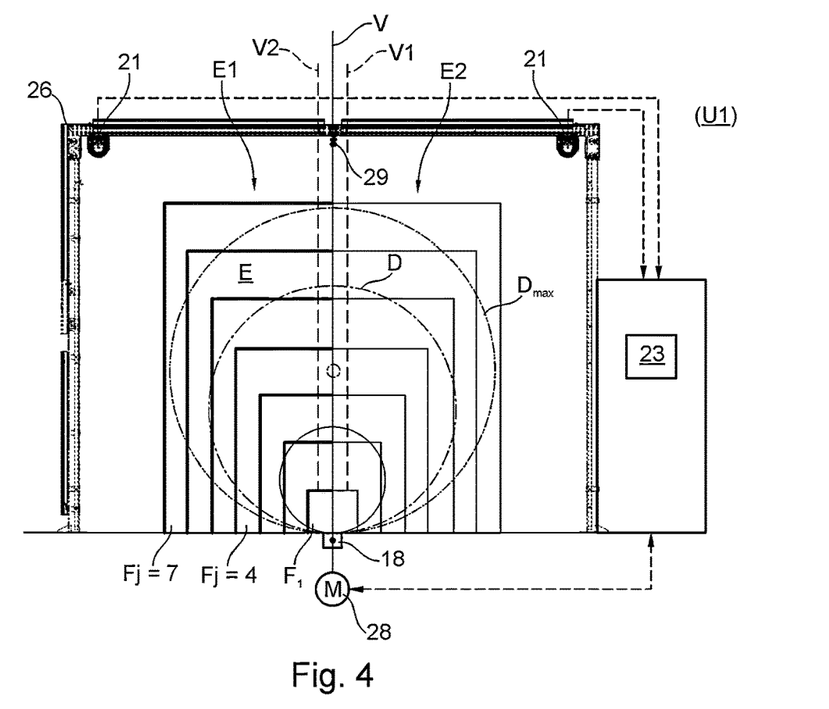
FIG. 4 a front view of the access point into the safety zone including schematically illustrated protection fields of a first example of a protection field gradation, and an exemplary schematic illustration of a first mode of operation or a first monitoring case.

The monitoring sensor system comprises two sensors 21 configured as scanners 21 as well as evaluation means 23, which are implemented therein and/or in a separate evaluation device and by which the result of the scan, i.e., the respective recorded scan image, can be checked for stored and/or storable criteria and/or patterns. The two scanners 21 are provided on both sides of the transport path, in particular on both sides of a vertical V situated in the monitoring plane E and intersecting the roll axis of rolls 17 (16) transported from the plane E on the provided transport path. They are preferably arranged at the same height and/or above the upper side of a transported roll 17 (16) having a maximum diameter $D_{max}$ to be used, for example higher than 1,800 mm above ground, and/or axially symmetrically with respect to the aforementioned vertical V. For example, they are arranged at a stand 26, for example a portal-like frame 26, such that their measuring or scanning beam passes over an angular region situated in the plane E and/or that they each monitor an angular region situated in the plane E.

For monitoring, the access point 11; 12 is now monitored by the two scanners 21 in a pattern of protection fields M(Fj) including, i.e., for example at least comprising or possibly consisting of, multiple protection fields Fj having various sizes and/or shapes, wherein, however, for at least multiple of the protection fields Fj having various sizes and/or shapes, the scan images of the two scanners 21 are checked for an, in particular simultaneous, breach of the relevant protection fields Fj having various sizes and/or shapes in differing, adjoining or overlapping partial regions E1; E2 of the plane E, and wherein information about the permissibility of a determined protection field breach is derived by way of an evaluation of the breach patterns of breached protection fields Fj obtained in the two partial regions. The simultaneousness may, for example, be understood within the meaning that at least electrotechnical or evaluation-induced operating time differences as well as, possibly, a relative entry tolerance, whose threshold value for example, possibly as a function of the present or system-induced operating transport speed, has a value of no more than one second, preferably no more than 100 milliseconds, are still considered to be simultaneous.

The evaluation means 23, for example an evaluation routine provided in a data processing and memory means, is configured to monitor the images supplied by the two scanners 21, in two differing partial regions E1; E2 of the plane E, which, for example, in sum, cover at least the overall area to be monitored or being monitored, for a penetration of an object into one or more of a number k, for example k from 4 to 12, in particular from 6 to 10, of specified and/or specifiable protection fields Fj (j=1, 2, 3 . . . k) that are, in particular, at least partially nested inside one another, i.e. for a breach of defined surface areas Fj situated in the plane E, and to evaluate these as to whether, in the event that a disruption, i.e., a protection field breach, occurs in at least one of the protection fields Fj, in the two partial regions E1; E2 to be evaluated only one or more of the same protection fields Fj, i.e., the same breach pattern or breach patterns that only deviate from one another by a definable number of one or more next-larger and/or next-wider protection fields Fj, i.e., on the one side or in the one partial region E1; E2, one, or possibly a defined number of, for example continuously or steadily ascending, next-larger breached protection fields Fj (i.e., in particular, encompassing the relevant protection field Fj entirely or at least in the width and/or toward the top) than on the other side or in the other partial region E2; E1. Preferably, the aforementioned tolerance limit is given as the number one, i.e., no more than one next-larger protection field Fj+1 may be breached on one of the sides or in one of the partial regions E1; E2 than on the other side or in the other partial region E2; E1.

Protection fields Fj of adjoining field sizes shall, for example, be understood to mean two protection fields Fj; Fj+1, of which the larger or at least the wider protection field Fj, in the set of present protection fields Fj, represents the next-larger or next-wider protection field Fj and, at least in terms of the extension in the horizontal direction and/or toward the top, encompasses the smaller and/or narrower of the two protection fields Fj−1. The protection fields Fj to be considered preferably extend mirror-symmetrically with respect to the aforementioned vertical V in the plane E. The partial regions E1; E2 of the protection fields Fj to be evaluated by the two scanners 21 are highlighted by two differently thick delimitation lines in the illustrations of FIG. 4 to FIG. 10.

The area to be monitored thus comprises a number k of protection fields Fj to be monitored, of which at least multiple are encompassed, in staggered size, by in each case the next-larger and/or, within the above meaning, next-wider protection field Fj, entirely or at least in the width and/or, in particular and, toward the top, wherein the largest or widest of the protection fields Fj (where j=k) is formed, for example, by the area to be monitored and/or extends inwardly from the delimitations of the passage 12 (11) and preferably encompasses the remaining protection fields Fj, entirely or at least in the width and/or, in particular and, toward the top, and wherein, for example, a first protection field F1, with its delimitations, intersects the protection field boundaries of the, or multiple of the, other protection fields Fj and, as a result of its shaping, provides information about the nature and/or size of an entering roll 17 (16), as a function of the presence of a field breach.

The monitoring sensor system is preferably configured such that at least one drive means 28 driving the transport means 24, for example a motor 28, stops and/or a warning signal is output when a protection zone breach is determined, for example an operator impermissibly passes through the area safeguards or monitored plane E, while monitoring of the access point 12 (11) is activated and without muting caused by an "allowed" roll transport. The same applies to the case where, while muting is activated for the particular area during a roll transport, additionally a non-symmetrical protection field breach within the above meaning occurs or a breach of the largest protection field Fj (j=k) occurs in the edge region bordering the next-smaller protection field Fj.

It is possible, for example, to switch between a switch state of the monitoring sensor system in which any protection field breach results in safety measures and a switch state in which a symmetrical entry results in the muting function being activated for a corresponding protection field area, and a non-symmetrical breach results in the safety measures being activated, as a result of a roll 17 (16) approaching. The approaching can, for example, take place by sensors 29, for example proximity sensors 29, in particular proximity switches 29, provided at the transport path, in particular above the transport path on both sides of the plane E. If the second sensor 29 has also been passed through, it is possible to switch from the switch state in which the passage of the roll is tolerated back into the switch state for monitoring all protection field breaches.

If a penetration, as recognized by way of the images of the respective scanners 21, in the partial region E1; E2 to be evaluated by the particular scanner 21 occurs simultaneously in only one or more of the same protection fields Fj, possibly taking a tolerance mentioned below into consideration, it is assumed that an object that is axially symmetrical with respect to the vertical V is entering, which, for example, can be a roll 17 (16) sitting on a transport means 24, with or without a so-called adapter 27, i.e., a, for example likewise symmetrical, attachment 27, on the transport cart 24 for rolls 17 (16) having a smaller diameter D. However, in order to avoid erroneous detections caused by out-of-roundness in the wound roll or minor position errors on the transport cart 24 and/or transport path, tolerance ranges are provided, for example, during the evaluation of the disruption. This tolerance range is established, for example, in that a deviation in the breach between the two partial regions E1; E2 has only a definable small number of steps, preferably only one step, i.e., in a partial region E1; E2, an additional breach of the next-larger protection field Fj is tolerated, versus the partial region E2; E1. In an embodiment that is advantageous in terms of safety, however, this does not apply to an entry into the area that inwardly adjoins the delimitations of the passage, for example the stand 26 or a frame 26, up to the next-smaller of the defined or definable protection fields Fj.

In the case of simultaneous entry into only one or more of the same protection fields Fj, possibly taking an aforementioned tolerance into consideration, a triggering of safety measures is suppressed, i.e., a so-called muting function is activated, for the area of the affected protection fields Fj or for the smallest affected protection field Fj encompassing the remaining, simultaneously breached protection fields Fj, while monitoring in particular for a non-symmetrical entry of an object into the partial regions E1; E2 is maintained for the portion, located outside thereof, of the plane E that is monitored by the two scanners 21, with safety measures to be accordingly triggered in the event of a breach, i.e., a non-symmetrical entry, for example an acoustic and/or optical warning and/or a stopping or blocking of the roll transport.

In a first embodiment and/or operating situation, in particular in a first monitoring case Ui, where i=1, 2, 3 etc., the partial regions E1; E2 to be evaluated can extend mirror-symmetrically with respect to a vertical separation line V, in particular a separation line V given by the aforementioned vertical V. Coming from both sides, they can extend exactly up to the vertical V, but, to be safe, also have minor overlap, so that the one partial region E1; E2 extends up to a, for example vertically extending, first edge line V1 situated centrally in relation to the transport path, and the other partial region E1 extends, from the other side, up to a second, for example vertically extending, edge line V2 that extends on the other side of the vertical V situated centrally in relation to the transport path. In this first mode of operation or embodiment, or this first monitoring case U1, a so-called symmetrical field set forms the basis for the evaluation of the protection fields Fj that are provided in the process and formed, in particular, symmetrically with respect to the vertical (see, e.g., FIG. 4 or FIG. 6).

However, this symmetrical measurement field evaluation can possibly be problematic when an object resting on top of the roll 17 (16) or a living being, possibly within the scope of existing tolerances, simultaneously enters, for example, a larger protection field Fj+1; Fj+2, possibly taking the aforementioned tolerances into consideration. Here, for example, a change in diameter of a stepped roll 17 (16), i.e., a roll 17 (16) comprising sections that have differing diameters D, could erroneously be inferred. It may then not be possible to distinguish between the presence of a stepped roll 17 (16) and an impermissible penetration of an approximately symmetrical object or living being on the roll 17 (16).

So as to preclude this or at least make it more difficult, in a second embodiment and/or operating situation, in particular in a second monitoring case U2; U2.1; U2.2, the partial regions E1; E2 to be evaluated of the images supplied by the two scanners 21 can be non-symmetrical with respect to the vertical V and/or the boundary between the partial regions can extend at an incline with respect to the vertical V, for example of at least 20° (see, e.g., in FIG. 4, a separation line A asymmetrically dividing the area to be monitored into partial regions E1; E2 to be evaluated). Such an asymmetrical evaluation, also referred to as operation or a monitoring case U2; U2.1; U2.2 with an asymmetrical field set, is preferably utilized at least when, for example also, stepped rolls 17 (16) are to be used or can be used, or in particular when, during operation with an initially symmetrical evaluation, i.e., during operation with a symmetrical field set in a first monitoring case U1, defined criteria are met for switching into an operation with asymmetrical evaluation, i.e., operation with an asymmetrical field set in a second monitoring case U2; U2.1; U2.2.

In an advantageous embodiment, when changes in diameters occur in consecutive rolls 17 (16), or also in the case of changes in diameters within a stepped roll 17 (16), and when simultaneously a breach of the protection fields Fj occurs, possibly taking the above tolerances into consideration, a switch in areas takes place, generally independently of the operation in the first or second aforementioned monitoring case U1; U2; U2.1; U2.2, between the protection field or fields Fj most recently excluded by muting and the protection field or fields Fj to be excluded by muting after a change in diameter has occurred. The same applies when a roll 17 (16) enters the plane E previously monitored without muting. A generation or an adaptation, i.e., a decrease or an increase, of the area in which the safety measure is suppressed is thus preferably carried out automatically by the evaluation means 23, provided that the protection field breach recognized by way of the two scanners 21 in the evaluated partial regions E1; E2 takes place simultaneously in the same protection field Fj, or taking the above tolerance into consideration in protection fields Fj having consecutive sizes.

The protection fields Fj of a monitoring case U1; U2; U2.1; U2.2 can vary in terms of number, size, gradation and/or shape for various applications, roll types and/or roll sizes and, as mentioned above, can be predefinable and kept available in the data processing and memory means. The protection fields Fj are preferably present in parameterized form and can be parameterized for the purpose of modification and/or creation via an interface to the evaluation means 23. If multiple field sets that differ in terms of number, size, gradation and/or in the monitoring case are present, these are likewise stored and preferably parameterizable.

For example, in this way, a pattern of protection fields M(Fj) including a plurality, such as 3 to 11, in particular 5 to 9, here preferably 7, protection fields Fj situated inside one another can be provided, which, as is shown in FIG. 4 for example, are arranged such that the protection fields Fj, except for the largest of this plurality of protection fields Fj, are in each case encompassed by the next-larger protection field Fj+1, entirely or at least in the width and/or, preferably and, toward the top. Some or all of this plurality can end at the same height in the lower region. If necessary, one or more wider, i.e., extending further to the outside, protection fields Fj can also end with their lower delimitation, for example slightly, above the lower delimitation of the next-smaller protection field Fj−1. In addition, a further protection field, for example referred to here and in FIG. 6 to FIG. 10 as a first protection field F1, can be provided, which is not encompassed by the others and used to identify the roll size and/or position.

In the first embodiment and/or operating situation or the first monitoring case U1, the evaluation of the images ascertained by the scanners 21 is based on a separation that is symmetrical with respect to the vertical V, if necessary including an overlapping area, while in the aforementioned second embodiment and/or operating situation or the second monitoring case U2, the evaluation of the images ascertained by the scanners 21 is based on a separation that is asymmetrical with respect to the vertical V, for example along a separation line A extending at an incline with respect to the vertical V, if necessary including an overlapping area between two edge lines A1; A2 situated on both sides of the separation line A and, for example, on the same side of the vertical V.

Figure 5:
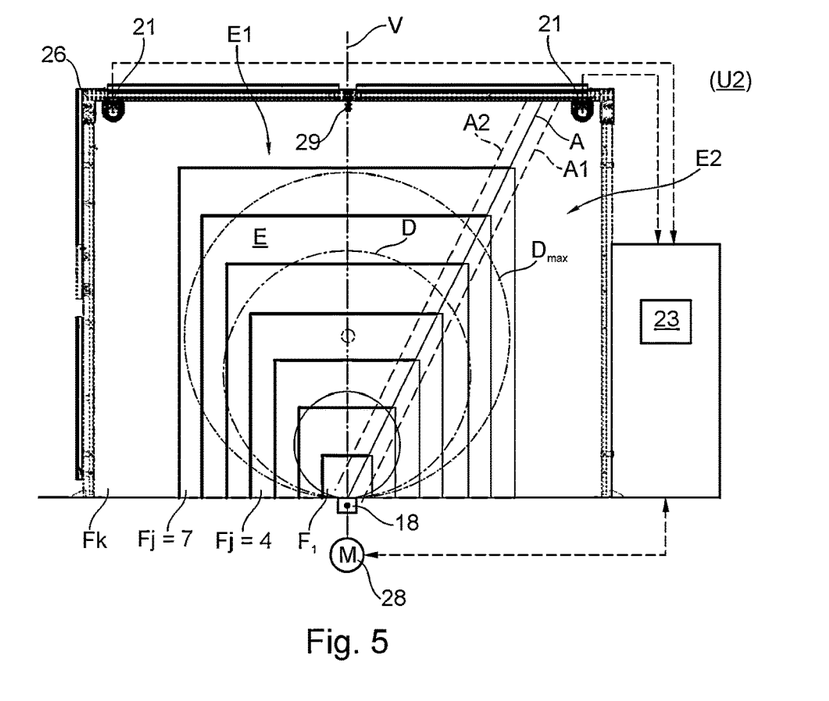
FIG. 5 a front view of the access point into the safety zone including schematically illustrated protection fields of a first example of a protection field gradation, and an exemplary schematic illustration of a second mode of operation or a second monitoring case.
Figure 6:
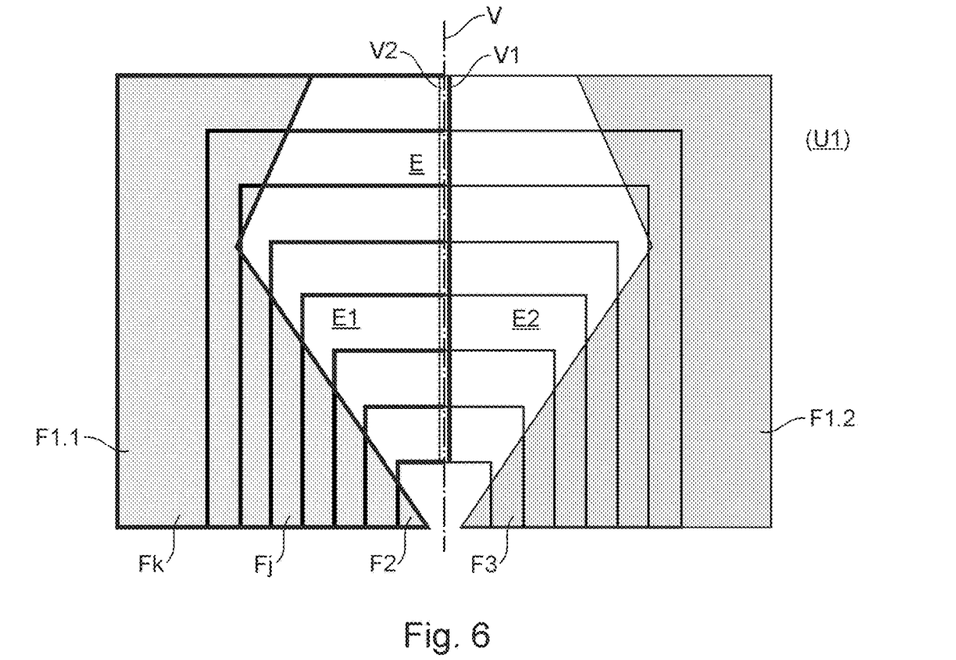
FIG. 6 a schematic illustration of protection fields of a second example of a protection field gradation, and an exemplary schematic illustration of a first mode of operation or a first monitoring case.
Figure 7:
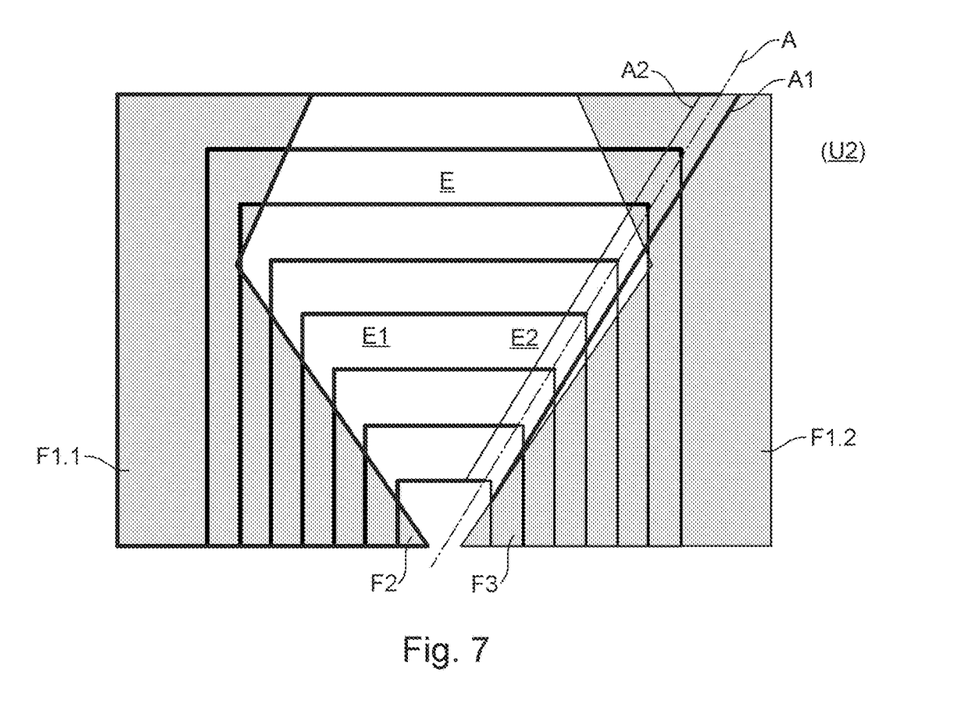
FIG. 7 a schematic illustration of protection fields of a second example of a protection field gradation, and an exemplary schematic illustration of a second mode of operation or a second monitoring case.
Figure 8:
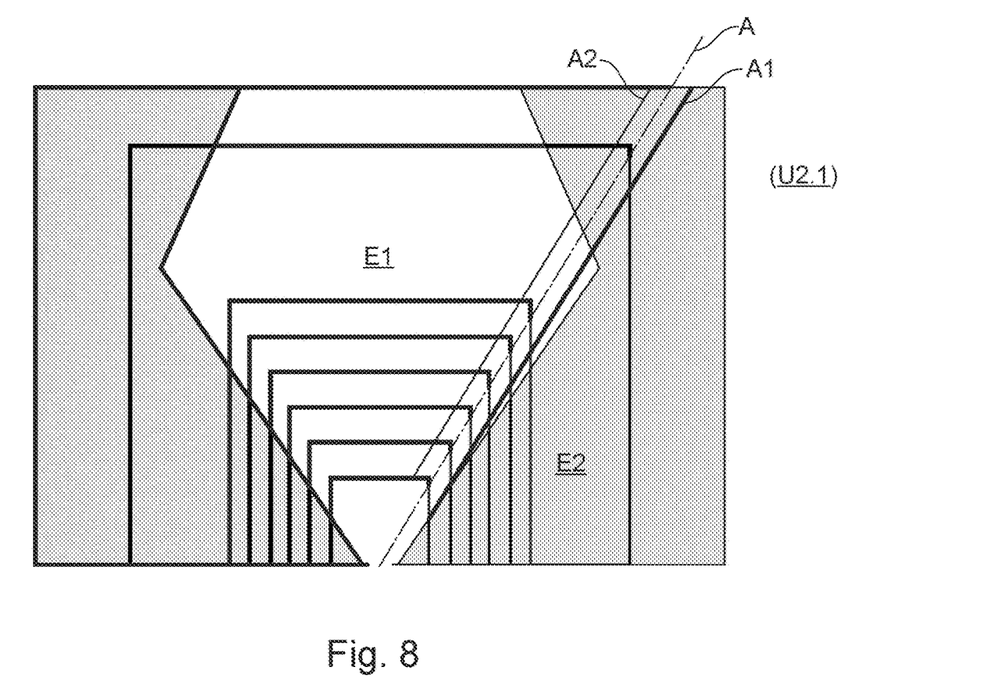
FIG. 8 a schematic illustration of protection fields of a variant of a protection field gradation in a second mode of operation or in the second monitoring case.
Figure 9:
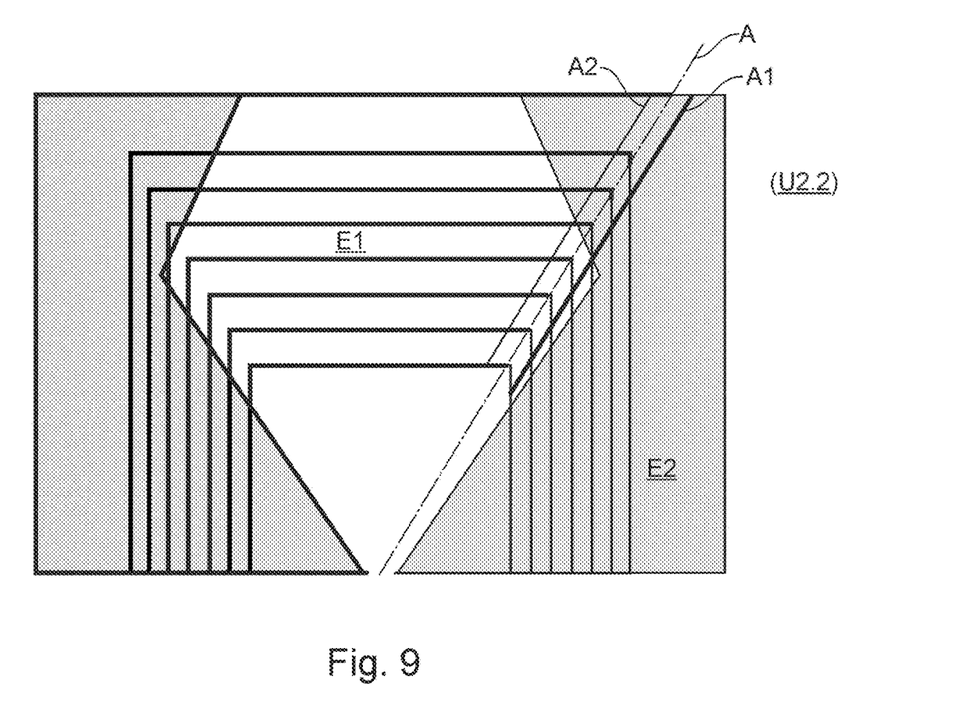
FIG. 9 a schematic illustration of protection fields of a second variant of a protection field gradation in the second mode of operation or in the second monitoring case.

In an embodiment that is to be particularly preferred, in which various operating situations can be recognized and a switch into another monitoring case Ui, which may be necessary, is possible, a first protection field F1 located furthest to the inside, for example in the region close to the floor, is not encompassed, as in the example according to FIG. 4 and FIG. 5, by multiple or all larger protection fields Fj, but extends in the plane E from both sides of the passage 12 (11) to be monitored to a respective field boundary, which extend mirror-symmetrically with respect to the vertical V and/or delimit between one another a surface area that is symmetrical with respect to the vertical V, not attributable to the first protection field Fj, in particular shaped convexly toward both sides, or widens steadily toward the top (see, e.g., FIG. 6 to FIG. 10). The two lateral field parts F1.1; F1.2 of the first protection field F1 (shaded in FIG. 6 to FIG. 10 to provide a better understanding) can be connected to one another in the region of the upper and/or lower edges or, as shown, form two parts F1.1; F1.2 of a two-part first protection field F1.

In one variant hereto, the first protection field F1 can also be defined in exactly the opposite manner, wherein the protection field is then formed by the interior symmetrical area (not shaded), and a switching logic (see below) that is tied to a breach/non-breach of the first protection field F1 should then be defined in exactly the opposite manner.

The field boundary or boundaries of the first protection field Fj converges or converge in the lower edge region of the monitored plane E or end in the lower edge region within the boundaries of a smallest protection field Fj of a group of protection fields Fj, of which the respective protection field is encompassed, entirely or at least in terms of the extension in the horizontal direction and/or, preferably and, toward the top, by the respective next-larger and/or next-wider protection field Fj+1 of the group. Proceeding from the lower edge region, the field boundaries of the first field F1 (F1.1, F1.2) diverge on both sides of the vertical V so as to intersect the, in particular lateral, boundaries of multiple, for example at least the two innermost, of the group of protection fields Fj situated inside one another and/or widen the surface area formed between one another.

In an advantageous embodiment, the first protection field F1 extends to the upper edge of the area of the plane E to be monitored and intersects the outer delimitation of all remaining protection fields Fj. In an advantageous embodiment, the two lateral field boundaries of the first protection field F1, starting at a height that corresponds to at least half the height of a roll 17 (16) having a maximum diameter $D_{max}$ which is transported on the transport means 24 through the passage, converge again symmetrically and thereby form the aforementioned convex shape of the surface therebetween.

The profile of the two-sided field delimitation of this first protection field F1 can be steadily curved and/or polygon-like, i.e., be defined in sections by a number, here, for example, two in each case, straight lines continuing one another. The latter is of advantage, for example, with respect to a simple parameterization (see FIG. 6 and FIG. 7, for example).

For the particular, for example the symmetrical and/or the asymmetrical, monitoring case U1; U2, two or more variants of an aforementioned monitoring case U1; U2, for example multiple differing, second monitoring cases U2.1; U2.2, can be provided or kept available, which, even though they are subject to the same type of symmetry in terms of the evaluation, differ in terms of the number, size, gradation and/or shape of their set of protection fields Fj, and between which, in an advantageous embodiment, switching takes place or can take place, in particular automatically.

In an advantageous embodiment, for example, two monitoring cases U2.1; U2.2 with an asymmetrical field set can be provided, one for use with smaller rolls 17 (16) having a concentration of field boundaries situated further to the inside and toward the bottom (see, e.g., FIG. 8) and one for use with larger rolls 17 (16) having a concentration of field boundaries situated further toward the top and outside (see, e.g., FIG. 9).

Hereafter, a particularly preferred procedure during monitoring, in particular for controlling the monitoring process, will be described.

In a basic state, i.e., before an object to be transferred, e.g., a roll 17 (16), transport means 24 or receptacle, even breaches a protection field Fj of the monitoring plane E, the monitoring system is in a first monitoring case U1, in which, within the above meaning, a symmetrical field set is present or symmetrical partial regions E1; E2 are evaluated for field breaches (see, e.g., partial image a)) in FIG. 10).

If a field breach occurs in the area between the field boundaries of the largest protection field Fk, extending inwardly from the delimitations of the passage 12 (11), and of the next-smaller protection field Fj, hereafter also referred to as edge region, the aforementioned safety measures are triggered in any case, i.e., independently of possibly present additional protection field breaches. If a protection field breach is detected in this edge region, it is assumed that a person or an impermissibly large object has entered the area.

If, without the edge region being breached, a breach of one or more protection fields Fj different from the first protection field F1, which symmetrically encompasses the aforementioned lateral field parts F1.1; F1.2, occurs, without, however, also breaching the first protection field F1, operation takes place in the first monitoring case U1 or such a case is maintained. It is assumed, for example, that a roll section of a stepped roll 17 (16) has passed through.

If, starting from the basic state or in the first monitoring case U1, i.e., with a symmetrical field set, a breach of the first field F1 (F1.1, F1.2) is determined, a switch into a second monitoring case U2 takes place, i.e., into a monitoring process with an asymmetrical field set within the above meaning or an evaluation of asymmetrical partial regions E1; E2, for a field breach. In this monitoring type, an object situated on the roll 17 (16) or a living being can be recognized with higher certainty.

Figure 10:
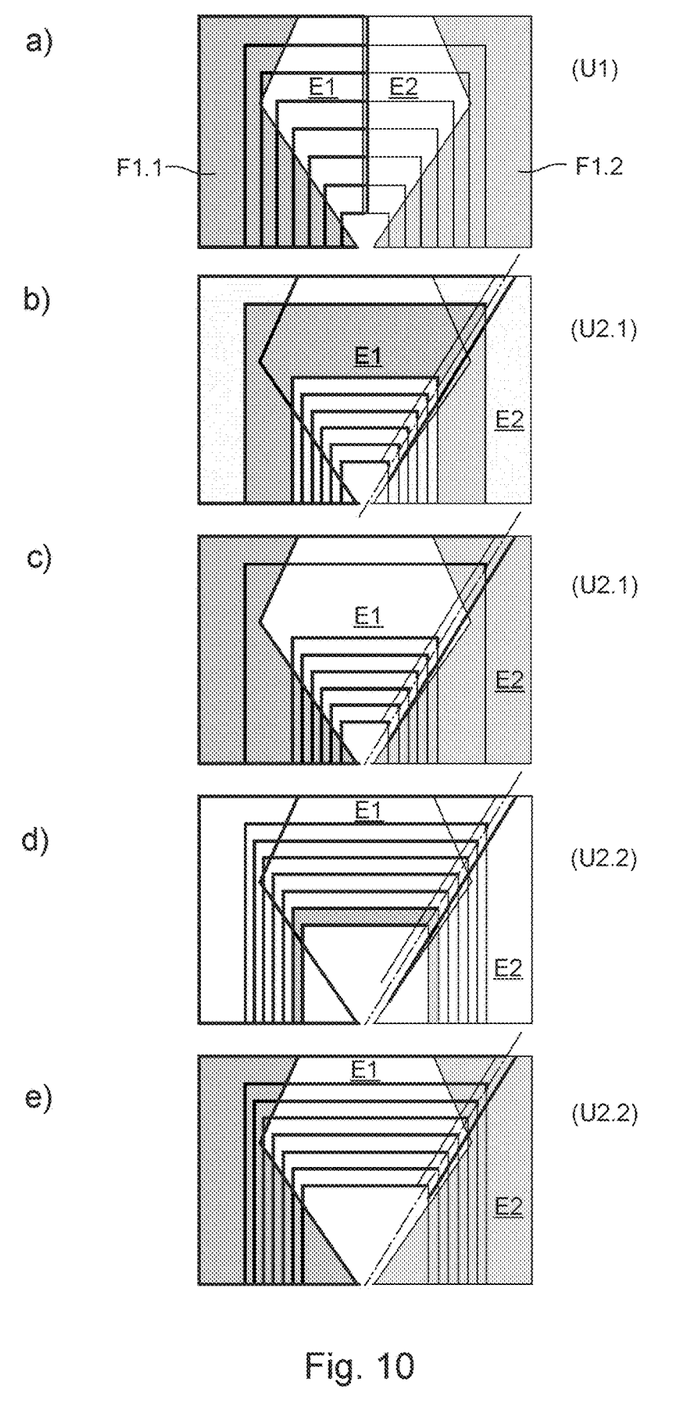
FIG. 10 schematic illustrations a), b), c), d) and e) of different sets of protection fields in various operating situations or monitoring cases.

As described above, two or more second monitoring cases U2 can be provided for a higher-level monitoring case U1; U2, namely a first variant U2.1 of the second monitoring case U2 for use with rolls 17 (16) that have a smaller diameter D compared to a limit diameter, and a second variant U2.2 of the second monitoring case U2 for use with rolls 17 (16) that have a larger diameter D compared to a limit diameter. The limit diameter can be assigned to the one or the other variant. For this case involving two variants U2.1; U2.2, preferably initially a switch is made to the variant U2.1 for smaller roll diameters D when switching from the first to the second monitoring case U1; U2; U2.1; U2.2 (see, e.g., FIG. 8 and FIG. 10b).

If, in the refinement with two variants U2.1; U2.2 for the second monitoring case U2, during operation in the first variant U2.1 for the second monitoring case U2 also the second-largest protection field Fj, or the protection field Fj situated on the inside adjoining the edge region, is breached, in addition to the protection fields Fj that are smaller by comparison, a switch is made to the second variant U2.2 for the second monitoring case U2. It is assumed that a large roll 17 (16) is present, and that a finer gradation in the area of the monitoring plane E that is located further to the outside, for example while maintaining the number of fields, is advantageous (see, e.g., FIG. 9).

If, in the refinement with two variants U2.1; U2.2 for the second monitoring case U2, during operation in the second variant U2.2 for the second monitoring case U2, also the innermost of multiple protection fields Fj encompassed by the respective next-larger protection Fj+1 is not breached, in addition to the first protection field Fj, while one or more larger protection fields Fj continue to be breached, a switch is made to the first variant U2.1 for the second monitoring case U2. (see, e.g., FIG. 8 or FIG. 10b).

When, during operation in the second monitoring case U2 or one of its variants U2.1; U2.2 and with an unbreached edge region, the first protection field F1 is no longer breached, however one or more protection fields Fj located within the edge region is or are breached, a switch is made into the first monitoring case U1, i.e., into operation with a symmetrical field set or an evaluation of symmetrical partial regions E1; E2 for a field breach (see, e.g., FIG. 6 or FIG. 10a).

In principle, permitted moving through the monitored passage or the activation of an aforementioned muting function, i.e., monitoring with a tolerance of protection field breaches that is dependent on certain criteria, is only possible when only an aforementioned breach of the same protection fields Fj, or at the most a breach of protection fields Fj of neighboring sizes, is determined in the two partial regions E1; E2. Another condition for the activation of an aforementioned muting function is preferably that the drive means 28 driving the transport means 24 on the transport section affecting the passage through the passage 12 (11) is active and/or that the output signal of the sensor 29 located upstream, in the transport direction T, from the entry into the monitoring plane E supplies the passage of an object before, within a defined time window, a breach of one of the protection fields Fj occurs and/or that the output signal of the sensor 29 located downstream, in the transport direction T, from the monitoring plane E only supplies the passage of an object after, within a defined window, a breach of one of the protection fields Fj has occurred and/or the sensor 29 located upstream from the entry into the monitoring plane E has supplied the passage of an object.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A method for monitoring an access point leading into a safety zone of a roll unwinder or winder, through which rolls can be transported in and/or out along a transport path; the access point being formed by an opening provided between two elements that mechanically delimit the safety zone, and the access point being monitored by a monitoring sensor system of a monitoring system; two scanners encompassed by the monitoring sensor system, with their respective measuring beams, in each case passing over an angular region situated in the same plane extending in the opening, characterized in that the access point is monitored in a pattern of protection fields including multiple protection fields having various sizes and/or shapes, that multiple of the protection fields having various sizes and/or shapes are in each case encompassed by a next-larger and/or next-wider protection field, entirely or at least viewed in the width and toward the top, that for multiple of these protection fields having various sizes and shapes, the scan images of the two scanners are checked for a breach of the relevant protection fields having various sizes and/or shapes in differing, adjoining or overlapping partial regions of the plane, and information about the permissibility of a determined protection field breach is derived by way of an evaluation of the breach patterns of breached protection fields obtained in the two partial regions.

2. The method according to claim 1, characterized in that the scan images originating from the two scanners are evaluated for a protection field breach in the differing partial regions of the respective relevant same protection field and/or that, for checking for a protection field breach, protection fields are used which extend in the plane mirror-symmetrically with respect to a vertical that centrally intersects the transport path in the plane.

3. The method according to claim 1, characterized in that evaluation means monitor the scan images supplied by the two scanners, in the two differing partial regions of the plane, which, however, in sum cover the overall monitored area, for a penetration of an object into one or more of the protection fields having various sizes and/or shapes, and evaluate these as to whether, in the event that a disruption, i.e., a protection field breach, occurs in at least one of the protection fields, the same breach patterns are found across the protection fields to be considered, or breach patterns that only deviate from one another by a definable number of next-larger protection fields or wider and/or higher protection fields, by way of the scan images of the two scanners.

4. The method according to claim 1, characterized in that the partial regions evaluated for a field breach are situated symmetrically in at least one operating situation and/or in a first monitoring case and/or asymmetrically in at least one operating situation and/or a second monitoring case with respect to a vertical that extends in the plane and centrally intersects the transport path leading through the passage, as viewed transversely to the transport direction.

5. The method according to claim 4, characterized in that between the first and second monitoring cases or one of multiple variants of the second monitoring case occurs as a function of the occurrence of a breach of a first protection field of the plurality of protection fields,
the monitoring leading up to the passage of a roll to be transferred taking place in the first monitoring case;
a switch being made into a second monitoring case when a breach of the first field is determined; and
during operation in the second monitoring case or one of its variants for the case that the first protection field is no longer breached, however one or more of the remaining protection fields is or are breached, the monitoring process being switched into the first monitoring case.

6. The method according to claim 1, characterized in that the access point is monitored in a pattern of protection fields which comprises at least one protection field that is arranged and configured so as to be encompassed, at least in its width and/or toward the top, by the next-larger protection field, and/or in a pattern of protection fields made up of a number of protection fields, which in the number k of protection fields encompasses a plurality of protection fields nested inside one another such that a respective protection field of this plurality is in each case encompassed by a next-larger protection field, entirely or at least in its width and/or toward the top, and/or that the passage is monitored in 4 to 12 protection field steps and/or, using a plurality of 3 to 11 protection fields nested inside one another, that a respective protection field of this plurality is in each case comprised by a next-larger or next-wider and/or next-higher dimensioned protection field, entirely or at least in its width and/or toward the top.

7. The method according to claim 1, characterized in that, in the event that the same breach patterns are found across the protection fields to be considered, or breach patterns that only deviate from one another by a definable number of next-larger and/or next-wider protection fields, for the two partial regions by way of the scan images of the two scanners while an object is passing through, a triggering of safety measures is suppressed, i.e., a so-called muting function is activated, for the protection field or fields affected by the breach, and a safety measure is initiated in the event of a deviation beyond that in the two determined breach patterns.

8. A device for monitoring an access point leading into a safety zone of a roll unwinder or winder, through which rolls can be transported in and/or out, in particular for carrying out the method according to claim 1; the access point being formed by an opening provided between two elements that mechanically delimit the safety zone, and a monitoring sensor system being provided for monitoring the access point; the monitoring sensor system comprising two scanners, the respective measuring beams of which in each case pass over an angular region situated in the same plane extending in the opening, characterized in that a pattern of protection fields including multiple protection fields having various sizes and/or shapes is provided for monitoring the access point, of which multiple are in each case encompassed by a next-larger and/or next-wider protection field, entirely or at least viewed in the width and toward the top, and that evaluation means are comprised, which, for multiple of these protection fields having various sizes and shapes, check and/or can check the scan images of the two scanners for a breach of the relevant protection fields having various sizes and/or shapes in differing, adjoining or overlapping partial regions of the plane.

9. The device according to claim 8, characterized in that the scan images of the two scanners can be evaluated by the evaluation means for a protection field breach in the differing partial regions of the respective same protection field situated in the plane and/or information about the permissibility of a determined protection field breach can be derived by way of an evaluation of the breach patterns of breached protection fields obtained in the two partial regions.

10. The device according to claim 8, characterized in that the two scanners are arranged on both sides of the transport path and/or are arranged at the same height and/or above the upper side of a transported roll having a maximum diameter to be used and/or are arranged axially symmetrically with respect to a vertical, which extends in the monitoring plane and is situated centrally in relation to the transport path leading through the passage.

11. The device according to claim 8, characterized in that the one or more of the protection fields used for checking for a protection field breach extend in the plane mirror-symmetrically with respect to a vertical that centrally separates the transport path in the plane.

12. The device according to claim 11, characterized in that a first protection field is provided so as to partially overlap at least one smallest of the protection fields situated inside one another and/or so as to extend in the plane from both sides of the passage to be monitored to a respective field boundary, which between one another delimit a surface area that is symmetrical with respect to a vertical and not attributable to the first protection field.

13. The device according to claim 8, characterized in that the evaluation means are configured to monitor the scan images supplied by the two scanners for a penetration of an object into one or more of the protection fields having various sizes and/or shapes in the two differing partial regions of the plane, which, however, in sum cover at least the overall monitored area, and to evaluate these as to whether, in the event that a disruption occurs, i.e., a breach in at least one of the protection fields, the same breach patterns are found across the protection fields to be considered, or breach patterns that only deviate from one another by a definable number of next-larger and/or next-wider protection fields, by way of the scan images of the two scanners.

14. A printing press, comprising a roll unwinder, from which web-format printing substrate can be unwound, and/or a roll winder, onto which previously printed web-format printing substrate can be wound, and a printing unit, a safety zone extending on at least the operating side of the unwinder and/or winder, which is bounded by the unwinder and winder themselves as well as by one or more adjoining sub-assemblies and/or mechanical barrier devices and comprises at least one first access point, which is monitored by sensors and through which rolls can be transported into and/or out of the safety zone, characterized by a device according to claim 8.

15. The printing press according to claim 14, characterized in that the printing unit is configured as a printing unit that operates according to a plateless printing method and/or comprises ink jet print heads.

\* \* \* \* \*